Patented Mar. 23, 1937

2,074,993

UNITED STATES PATENT OFFICE 2,074,993

METHOD OF TREATING RUBBER

Robert L. Sibley, Nitro, W. Va., assignor, by mesne assignments, to Monsanto Chemical Company, St. Louis, Mo., a corporation of Delaware No Drawing. Application April 6, 1934, Serial No. 719,361

20 Claims. (Cl. 18—50)

This invention relates to the manufacture of rubber and rubber-like compounds and it has particular relation to the manufacture of compounds of that character which are exposed to the effects of light, heat and oxygen.

The object of the invention is to provide a rubber compound which offers particular high resistance to the above deterioration agencies thereby extending the period of usefulness thereof.

Heretofore, it has been observed that rubber and rubber-like materials, such as balata or gutta percha upon exposure to light, air or heat either alone or in combination, tended quickly to harden or lose their tensile strength and elasticity thereby becoming unfit for further service. It has been proposed to overcome these effects by incorporating into the rubber or rubber-like compounds certain organic materials termed "anti-oxidants" or age resisters. The chief object of this invention, then, is to provide a new and superior class of age resisters or antioxidants.

The substances which are employed as antioxidants or age resisters according to the present invention are reaction products of ketones and compounds having the general formula

HO—R—R'—Y,

R represents a benzene residue having a free unsubstituted position para to the hydroxyl group, R' represents an aromatic hydrocarbon radical and Y represents hydrogen or a hydroxyl group. It is believed the preferred class of compounds possesses the structural formula of

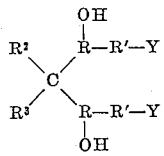

where $R^2$ and $R^3$ are alkyl, aryl or alkylene groups, said alkylene groups being joined to form a ring, R represents a benzene radical having a free unsubstituted position para to the hydroxyl group, R' represents an aromatic hydrocarbon radical and Y represents hydrogen or a hydroxyl group.

For example, the following are typical ketones which are reactive with compounds of the formula HO—R—R'—Y given above to form therewith members of the preferred class of antioxidants: acetone, methyl ethyl ketone, methyl isobutyl ketone, di-isopropyl ketone, cyclohexanone, methyl cyclohexanone, methylpentanon, acetophenone and benzophenone. As typical compounds possessing the formula

HO—R—R'—Y,

R represents a benzene residue having a free unsubstituted position para to the hydroxyl group, R' represents an aromatic hydrocarbon radical and Y represents hydrogen are: Ortho hydroxy diphenyl

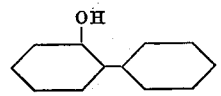

ortho benzyl phenol

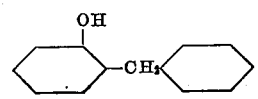

2-benzyl, ortho cresol

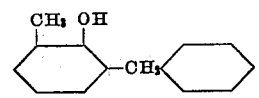

meta hydroxy diphenyl

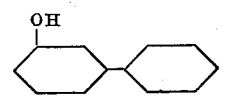

As typical compounds wherein Y represents the hydroxyl group in the formula given above are: 2:2'-hydroxydiphenyl

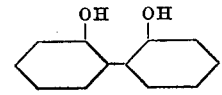

3:3'-hydroxydiphenyl

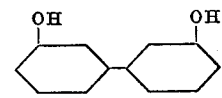

Any one or a mixture of the above enumerated substances with other known antioxidants may be incorporated into rubber with good effect on its aging properties.

One method whereby the preferred class of materials, for example the reaction product of cyclohexanone and ortho hydroxy diphenyl, was prepared comprises the following, although other methods obvious to those skilled in the art may be substituted therefor: substantially 50 parts by weight of cyclohexanone (a slight excess over one-half a molecular proportion) and substantially 170 parts by weight of ortho hydroxy diphenyl (one molecular proportion) were placed in a suitable reactor, substantially 100 parts by weight of glacial acetic acid added thereto and the reaction mixture heated for a suitable period of time, for example 30 hours, at a temperature of substantially 65° to 85° C. On completion of the heating step, the product so formed was preferably dissolved in an organic solvent, for example chloroform, and washed with water until neutral. After elimination of the solvent and any unreacted ortho hydroxy diphenyl, the preferred material was obtained as a dark brown liquid. It is believed the product so obtained has the structural formula of

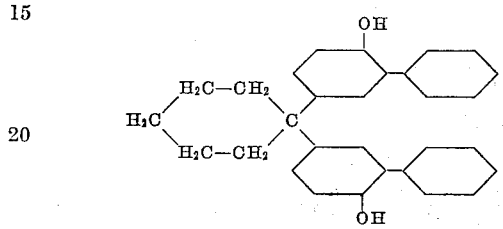

As one specific embodiment of the invention the product so obtained was incorporated in a rubber stock comprising

|  | Parts |
|---|---|
| Pale crepe rubber | 100 |
| Zinc oxide | 60 |
| Lithopone | 20 |
| Sulfur | 2 |
| Benzothiazyl-thio-benzoate | 0.825 |
| Diphenyl guanidine phthalate | 0.675 |
| Paraffin | 0.25 |
| The reaction product of cyclohexanone and ortho hydroxy diphenyl | 1.0 |

The rubber stock so compounded was then vulcanized by heating sheets of the stock in the usual manner for different periods of time in a press maintained at the temperature of twenty pounds of steam pressure per square inch (that is 258° F.). Portions of the stock cured as set forth were then artificially aged by heating said stock in the Bierer-Davis oxygen bomb for 120 hours at a temperature of 70° C. and under a pressure of 300 pounds of oxygen per square inch. The results obtained on testing the aged and unaged stocks follow:

Table I

| Cure | | | Modulus of elasticity in lbs./in.² at elongation of 500% | Tensile at break in lbs./in.² | Ult. elong. percent |
|---|---|---|---|---|---|
| Time, mins. | Pounds steam pressure | Hours aged | | | |
| 30 | 20 | 0 | 1920 | 4465 | 700 |
| 30 | 20 | 120 | 2215 | 3840 | 645 |
| 45 | 20 | 0 | 2080 | 4330 | 680 |
| 45 | 20 | 120 | 2265 | 3850 | 640 |
| 60 | 20 | 0 | 2015 | 4250 | 680 |
| 60 | 20 | 120 | 2040 | 3435 | 635 |

The data set forth in Table I show the desirable age resisting properties of the new and preferred class of organic compounds, as even on undergoing the exaggerated aging conditions of 120 hours in the oxygen bomb, the rubber stocks employing said antioxidants have undergone very little change.

Many of the antioxidants heretofore employed cannot be used in white colored stocks for the reason that darkening of the stocks takes place either in the vulcanization step or on exposure to sunlight or ultra violet light or both. The new and preferred class of antioxidants possesses the added advantage in that white stocks wherein they are incorporated are markedly resistant to the discoloring influences of both sunlight and ultra violet light. Thus, as one example showing this added very desirable characteristic of the preferred class of compounds, strips of each of the three cures of the above unaged cured rubber stock were exposed to ultra violet light rays generated by a mercury arc light maintained nine inches from the rubber test strips. After 52 hours exposure in the manner described the rubber test strips containing the preferred class of antioxidants, for example the reaction product of cyclohexanone and ortho hydroxy diphenyl, showed substantially no discoloration.

As a further specific embodiment of the present invention, the reaction product of substantially two molecular proportions of ortho benzyl phenol and substantially one molecular proportion of cyclohexanone has been prepared in a manner analogous to that given above for the cyclohexanone-ortho hydroxy diphenyl product. It is believed said product has the structural formula

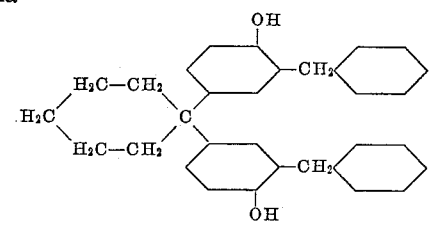

The product so obtained comprising a brown viscous liquid was incorporated in the usual manner in a rubber stock comprising

|  | Parts |
|---|---|
| Pale crepe rubber | 100 |
| Zinc oxide | 60 |
| Lithopone | 20 |
| Sulfur | 2 |
| Benzothiazyl-thio-benzoate | 0.825 |
| Diphenyl guanidine phthalate | 0.675 |
| Paraffin | 0.250 |
| The reaction product of ortho benzyl phenol and cyclohexanone | 1.0 |

The compounded rubber stock was vulcanized by heating in a press for different periods of time at the temperature of twenty pounds of steam pressure per square inch (that is 258° F.). Portions of the stock cured as set forth were then elongated 50% and artificially aged by heating for 4 hours in the air bomb maintained at a temperature of 121° C. and under a pressure of 100 pounds of air per square inch. The modulus and tensile characteristics of the aged and unaged vulcanized rubber stocks follow.

Table II

| Cure | | | Modulus of elasticity in lbs./in.² at elongations of— | | Tensile at break in lbs./in.² | Ult. elong. percent |
|---|---|---|---|---|---|---|
| Time, mins. | Pounds steam pressure | Hours aged | 300% | 500% | | |
| 30 | 20 | 0 | 674 | 2055 | 4095 | 660 |
| 30 | 20 | 4 | 535 | 1580 | 2115 | 590 |
| 45 | 20 | 0 | 680 | 2115 | 3800 | 640 |
| 45 | 20 | 4 | 581 | 1705 | 2295 | 555 |
| 60 | 20 | 0 | 615 | 2048 | 4000 | 630 |
| 60 | 20 | 4 | 537 | 1583 | 2030 | 560 |

The data set forth in Table II show the marked age resisting properties of the new and preferred class of materials, as even on undergoing the extremely exaggerated aging conditions of the air bomb, the rubber stocks employing said antioxidants possess to a large degree the properties of the unaged rubber product. Furthermore, portions of the above unaged vulcanized rubber stocks, wherein the reaction product of ortho benzyl phenol and cyclohexanone was incorporated as antioxidant, showed substantially no discoloration on exposure to ultra violet light rays in the manner hereinbefore set forth.

From the data hereinbefore set forth, it is shown that rubber compositions containing small proportions of the preferred class of materials markedly resist the deterioration influences of light, heat and oxygen.

Obviously, the practice of this invention is not limited to the specific compositions given above, such compositions being merely illustrative of the manner of employing the antioxidant or age resisters of this invention. The antioxidant or age resisters may be employed in conjunction with other vulcanizing agents than those specifically disclosed, for this invention is applicable generally to pure rubber or rubber compositions of the most varied nature.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta-percha, rubber isomers and like products, whether or not admixed with fillers, pigments, vulcanizing or accelerating agents.

The present invention is limited solely by the claims attached hereto as a part of the present specification.

What is claimed is:

1. The method of preserving rubber which comprises treating rubber with a condensation product of substantially one molecular proportion of a ketone and substantially two molecular proportions of a compound having the general formula HO—R—R'—Y, wherein R represents a benzene residue having a free unsubstituted position para to the hydroxyl group, R' represents an aromatic hydrocarbon radical and Y represents hydrogen or an hydroxyl group, said condensation product being obtained by heating said reactants in an acid medium at a temperature between substantially 65° to 85° C.

2. The method of preserving rubber which comprises treating rubber with a condensation product of substantially one molecular proportion of a cyclohexanone and substantially two molecular proportions of a compound having the general formula HO—R—R'—Y, wherein R represents a benzene residue having a free unsubstituted position para to the hydroxyl group, R' represents an aromatic hydrocarbon radical and Y represents hydrogen or an hydroxyl group, said condensation product being obtained by heating said reactants in an acid medium at a temperature between substantially 65° to 85° C.

3. The method of preserving rubber which comprises treating rubber with a condensation product of substantially one molecular proportion of a cyclohexanone and substantially two molecular proportions of ortho hydroxy diphenyl, said condensation product being obtained by heating said reactants in an acid medium at a temperature between substantially 65° to 85° C.

4. The method of preserving rubber which comprises treating rubber with a condensation product of substantially one molecular proportion of cyclohexanone and substantially two molecular proportions of ortho hydroxy diphenyl, said condensation product being obtained by heating said reactants in the presence of glacial acetic acid at a temperature between substantially 65° to 85° C.

5. The method of preserving rubber which comprises treating rubber with a condensation product of substantially one molecular proportion of cyclohexanone and substantially two molecular proportions of ortho benzyl phenol, said condensation product being obtained by heating said reactants in the presence of glacial acetic acid at a temperature between substantially 65° to 85° C.

6. The method of preserving rubber which comprises treating rubber with a condensation product of substantially one molecular proportion of cyclohexanone and substantially two molecular proportions of 2-benzyl, ortho cresol, said condensation product being obtained by heating said reactants in the presence of glacial acetic acid at a temperature between substantially 65° to 85° C.

7. A composition comprising rubber and a condensation product of substantially one molecular proportion of a ketone and substantially two molecular proportions of a compound having the general formula HO—R—R'—Y, wherein R represents a benzene residue having a free unsubstituted position para to the hydroxyl group, R' represents an aromatic hydrocarbon radical and Y represents hydrogen or an hydroxyl group, said condensation product being obtained by heating said reactants in an acid medium at a temperature between substantially 65° to 85° C.

8. A composition comprising rubber and a condensation product of substantially one molecular proportion of a cyclohexanone and substantially two molecular proportions of a compound having the general formula HO—R—R'—Y, wherein R represents a benzene residue having a free unsubstituted position para to the hydroxyl group, R' represents an aromatic hydrocarbon radical and Y represents hydrogen or an hydroxyl group, said condensation product being obtained by heating said reactants in an acid medium at a temperature between substantially 65° to 85° C.

9. A composition comprising rubber and a condensation product of substantially one molecular proportion of a cyclohexanone and substantially two molecular proportions of ortho hydroxy diphenyl, said condensation product being obtained by heating said reactants in an acid medium at a temperature between substantially 65° to 85° C.

10. A composition comprising rubber and a condensation product of substantially one molecular proportion of cyclohexanone and substantially two molecular proportions of ortho hydroxy diphenyl, said condensation product being obtained by heating said reactants in the presence of glacial acetic acid at a temperature between substantially 65° to 85° C.

11. A composition comprising rubber and a condensation product of substantially one molecular proportion of cyclohexanone and substantially two molecular proportions of ortho benzyl phenol, said condensation product being obtained by heating said reactants in the presence of glacial acetic acid at a temperature between substantially 65° to 85° C.

12. A composition comprising rubber and a condensation product of substantially one molecular proportion of cyclohexanone and substantially two molecular proportions of 2-benzyl, ortho cresol, said condensation product being obtained by heating said reactants in the presence of glacial acetic acid at a temperature between substantially 65° to 85° C.

13. The vulcanized rubber product produced by heating rubber and sulfur in the presence of a condensation product of substantially one molecular proportion of a ketone and substantially two molecular proportions of a compound having the general formula HO—R—R'—Y, wherein R represents a benzene residue having a free unsubstituted position para to the hydroxyl group, R' represents an aromatic hydrocarbon radical and Y represents hydrogen or an hydroxyl group, said condensation product being obtained by heating said reactants in an acid medium at a temperature between substantially 65° to 85° C.

14. The vulcanized rubber product produced by heating rubber and sulfur in the presence of a condensation product of substantially one molecular proportion of a cyclohexanone and substantially two molecular proportions of a compound having the general formula HO—R—R'—Y, wherein R represents a benzene residue having a free unsubstituted position para to the hydroxyl group, R' represents an aromatic hydrocarbon radical and Y represents hydrogen or an hydroxyl group, said condensation product being obtained by heating said reactants in an acid medium at a temperature between substantially 65° to 85° C.

15. The method of preserving rubber which comprises treating rubber with a compound possessing the structural formula of

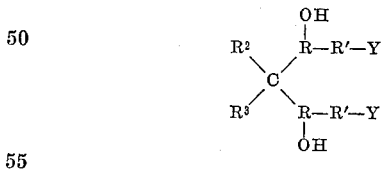

where $R^2$ and $R^3$ are alkyl, aryl or alkylene groups, said alkylene groups being joined to form a ring, R represents a benzene radical having a free unsubstituted position para to the hydroxyl group, R' represents an aromatic hydrocarbon radical and Y represents hydrogen or an hydroxyl group.

16. The method of preserving rubber which comprises treating rubber with a compound possessing the structural formula of

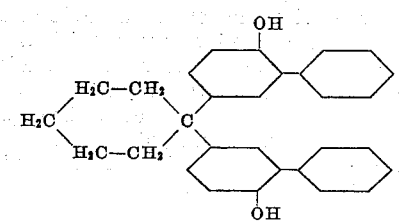

17. The method of preserving rubber which comprises treating rubber with a compound possessing the structural formula of

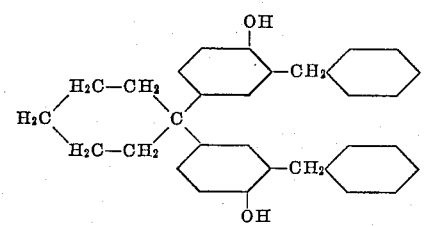

18. A composition comprising rubber and a compound possessing the structural formula of

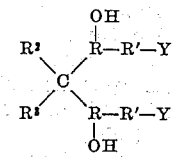

where $R^2$ and $R^3$ are alkyl, aryl or alkylene groups, said alkylene groups being joined to form a ring, R represents a benzene radical having a free unsubstituted position para to the hydroxyl group, R' represents an aromatic hydrocarbon radical and Y represents hydrogen or an hydroxyl group.

19. A composition comprising rubber and a compound possessing the structural formula of

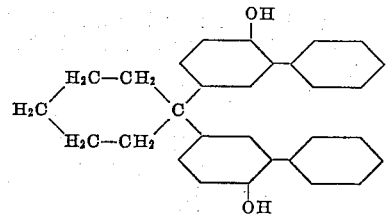

20. A composition comprising rubber and a compound possessing the structural formula of

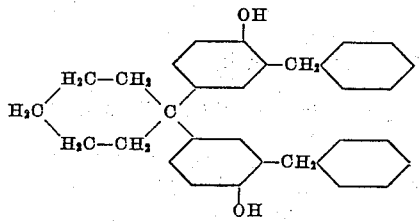

ROBERT L. SIBLEY.

CERTIFICATE OF CORRECTION.

Patent No. 2,074,993.   March 23, 1937.

ROBERT L. SIBLEY.

It is hereby certified that error appears in the printed specification of the above numbered patent requiring correction as follows: Page 2, second column, line 39, strike out the words and syllable "ultra violet light. Thus, as one example show-"; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.